Feb. 25, 1930.                    F. S. HERRIS                    1,748,223
                                  FISHING POLE
                                Filed June 15, 1927
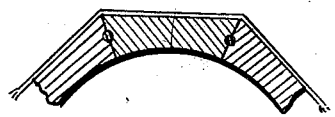
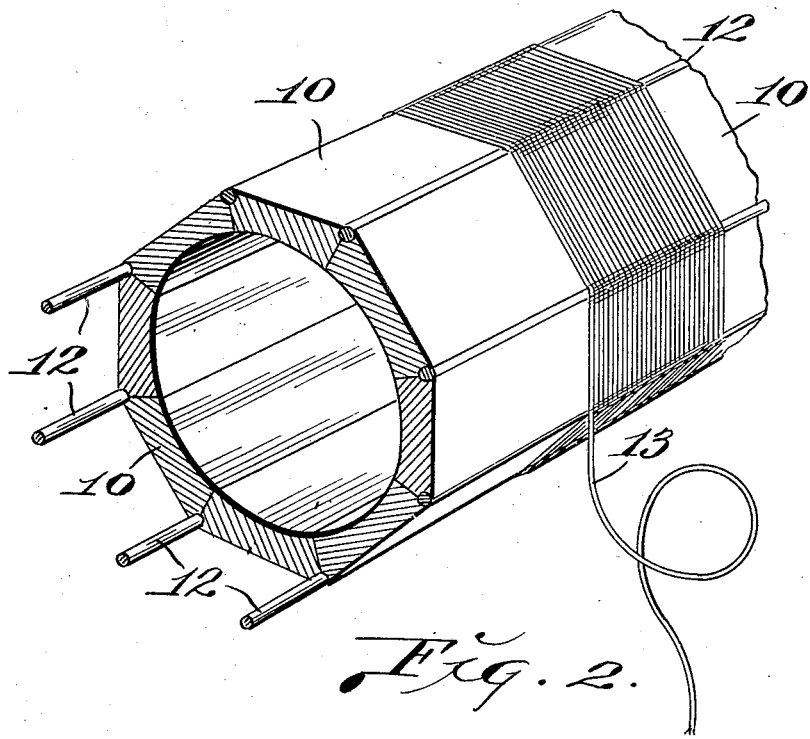
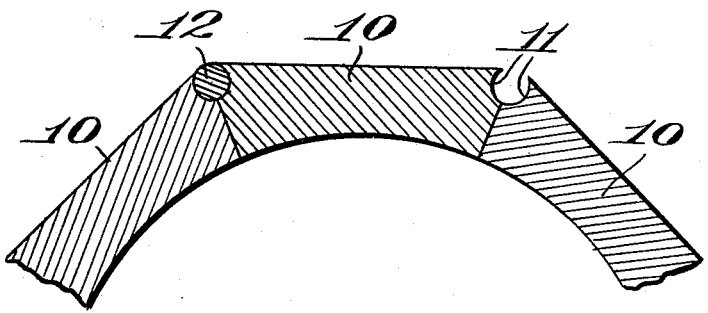

Patented Feb. 25, 1930

1,748,223

UNITED STATES PATENT OFFICE

FREDERICK S. HERRIS, OF LOS ANGELES, CALIFORNIA

FISHING POLE

Application filed June 15, 1927. Serial No. 198,966.

My invention relates to a fishing pole and has for its principal objects, the provision of a relatively simple, strong and durable, lightweight fishing pole which by virtue of its construction, possesses the requisite degree of resiliency and at the same time, said pole, after bending or flexing, will return to its original straight condition.

With the foregoing and other objects in view, my invention consists in certain novel features of construction and arrangement of parts that will be hereinafter more fully described and claimed and illustrated in the accompanying drawing in which;

Fig. 1 is a sectional perspective view of a short portion of a fishing pole embodying the principles of my invention.

Fig. 2 is an enlarged cross section of a portion of the body of the pole and showing the structure of the segments thereof.

Fig. 3 is a detailed section of a modified construction.

In the construction of my improved fishing pole, the main body portion is composed of a series of wooden strips 10 that are preferably identical in size and form and said strips in cross section are substantially segmental in form in order that when they are properly assembled, they will form a tubular body.

In practice I prefer to form the wooden strips with flat outer faces and with transversely disposed concave faces and thus, when the strips are properly assembled to produce the pole, the body of the latter is polygonal in cross section and the opening or chamber within the tubular body is substantially circular in cross section.

Obviously the outer faces of the strips 10 may be curved in cross section so as to produce a pole that is round or circular in cross section and if desired, the inner faces of the strips may be formed straight or flat so that the opening or chamber in the pole is substantially polygonal in shape.

The side edges of the wooden strips 10 are straight and flat so that they make direct physical contact with each other when the strips are properly assembled and to firmly unite the strips, a suitable adhesive such as waterproof glue is used in the joints between the meeting side faces of the segments.

The upper outer corners of the segments are formed with relatively small longitudinally disposed grooves or channels 11 and thus when the segmental strips are assembled in proper relation, substantial half-round channels are formed at the outer corners of the polygonal structure and occupying these channels are wires 12 of metal having a certain degree of resiliency.

After the segmental body of the fishing pole has been properly assembled with the wires positioned in the grooves 11, thread or fine cord 13 is wound onto the surface of the body of the pole and after the winding of the thread has been completed, the pole is finished on its surface with varnish or the like.

In some instances and particularly where a comparatively small and relatively lightweight pole is desired, the reinforcing wires 12 may occupy grooves formed in the meeting faces of the segmental strips forming the body of the pole, as illustrated in Fig. 3 and where such structure is employed, the wires will be firmly retained in the body of the pole and therefore, it will only be necessary to wrap the pole at separated points on the exterior thereof.

Fishing poles embodying my invention may be made in various lengths and the wooden segments 10 and the wires 12 may extend continuously from one end of the pole to the other, or the pole may be formed in joints and sections and which latter are constructed in accordance with my invention. Further the surface winding of thread or fine cord may extend continuously from one end of the pole or joint to the other, or the windings may be in short sections at different points throughout the length of the pole or the sections thereof.

The wires embedded in the surface of the body of the pole materially reinforce and strengthen the same and the employment of such re-inforcing means, enables a pole to be constructed that combines the desirable features of great strength with lightness of weight.

The formation of the body of the pole of segmental strips of wood and the provision of the resilient wires between the wooden strips or segments, produce a pole having the desired degree of resiliency and after bending or flexing the pole will return to its normal straight condition.

It will be readily understood that minor changes in the size, form and construction of the various parts of my improved fishing pole may be made and substituted for those herein shown and described, without departing from the spirit of my invention, the scope of which is set forth in the appended claims.

I claim as my invention:

1. As a new article of manufacture, a fishing pole comprising a series of segmental strips of wood assembled to form a tubular body, the meeting edges of which strips of wood are permanently secured to each other and metal wires embedded in the surface of the tubular body of the pole at the outer ends of the joints between the wooden strips.

2. As a new article of manufacture, a fishing pole comprising a series of segmental strips of wood assembled to form a tubular body, the meeting edges of which strips of wood are permanently secured to each other, metal wires embedded in the surface of the tubular body of the pole at the outer ends of the joints between the wooden strips and a winding of thread on the external surface of the body of the pole.

3. As a new article of manufacture, a fishing pole comprising a tubular body formed of segmental strips of wood, the outer corners of which strips of wood are cut away to form grooves and metal wires embedded in said grooves that are open on the external surface of the fishing pole.

4. As a new article of manufacture, a fishing pole comprising a tubular body formed of segmental strips of wood, the outer corners of which strips of wood are cut away to form grooves, metal wires embedded in said grooves that are open on the external surface of the fishing pole and a winding of thread on the external surface of the body of the pole.

In testimony whereof I affix my signature.

FREDERICK S. HERRIS.